Figure 1:
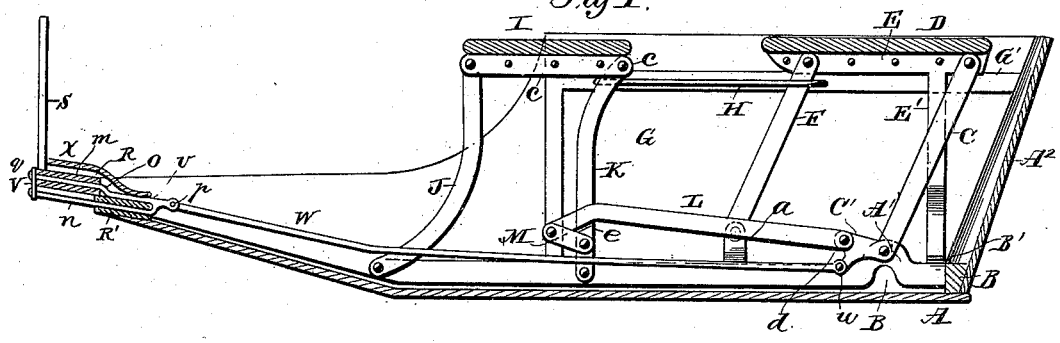

(No Model.) 5 Sheets—Sheet 1.

C. H. STRATTON.
JUMP SEAT VEHICLE.

No. 385,329. Patented June 26, 1888.

Witnesses
G. F. Downing
R. S. Ferguson

Inventor
Charles H. Stratton
By his Attorney
H. A. Seymour (No Model.)  5 Sheets—Sheet 2.

C. H. STRATTON.
JUMP SEAT VEHICLE.

No. 385,329. Patented June 26, 1888.

Witnesses
G. F. Downing
R. S. Ferguson

Inventor
Charles H. Stratton
By his Attorney
H. A. Seymour (No Model.)  
C. H. STRATTON.  
JUMP SEAT VEHICLE.

No. 385,329. Patented June 26, 1888.

Witnesses  
G. F. Downing  
R. S. Ferguson

Inventor  
Charles H. Stratton  
By his Attorney  
H. A. Seymour (No Model.) 5 Sheets—Sheet 4.
C. H. STRATTON.
JUMP SEAT VEHICLE.
No. 385,329. Patented June 26, 1888.
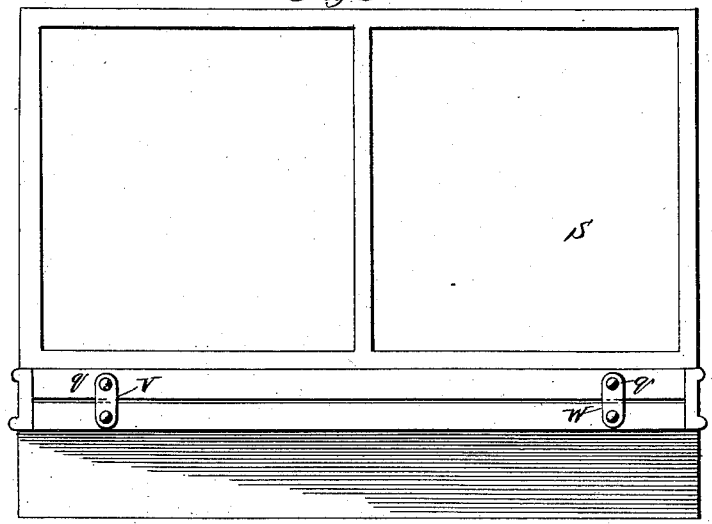
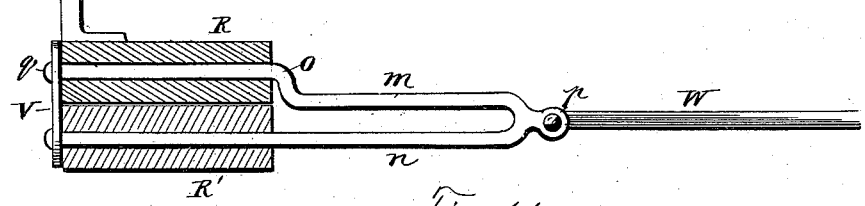
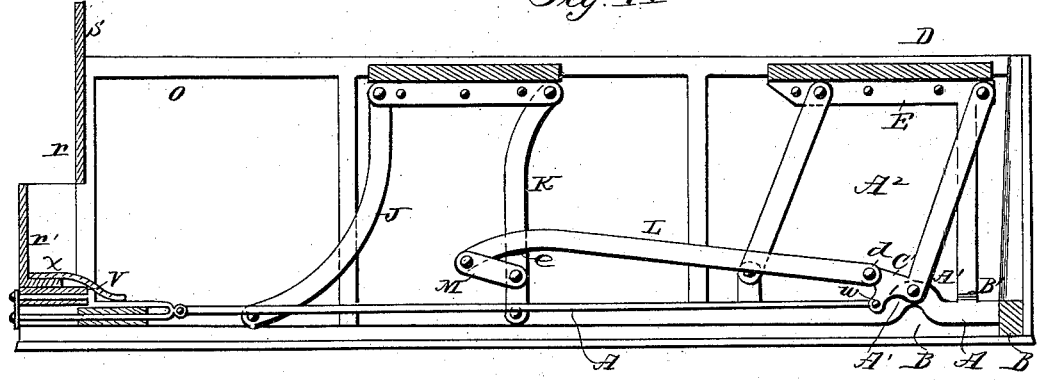
Witnesses
G. F. Downing
R. S. Ferguson
Inventor
Charles H. Stratton
By his Attorney
H. A. Seymour (No Model.) 5 Sheets—Sheet 5.
C. H. STRATTON.
JUMP SEAT VEHICLE.
No. 385,329. Patented June 26, 1888.
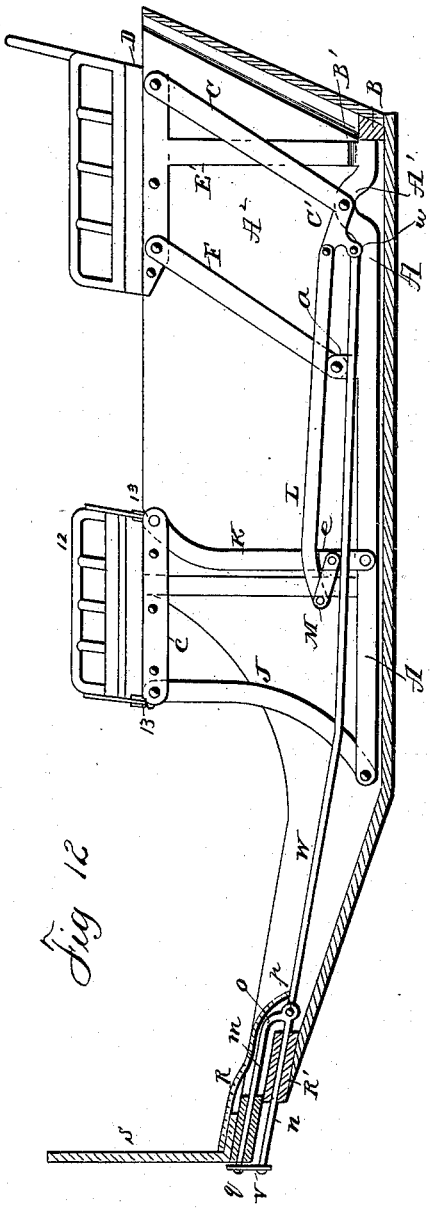
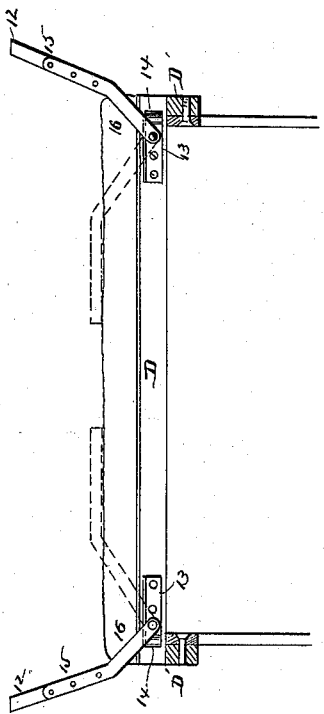
Witnesses
G. F. Downing
R. S. Ferguson
Inventor
Charles H. Stratton
By his Attorney
H. A. Seymour
N. PETERS, Photo-Lithographer, Washington, D. C.

UNITED STATES PATENT OFFICE.

CHARLES H. STRATTON, OF SALEM, OHIO.

JUMP-SEAT VEHICLE.

SPECIFICATION forming part of Letters Patent No. 385,329, dated June 26, 1888.

Application filed February 18, 1888. Serial No. 264,461. (No model.)

*To all whom it may concern:*

Be it known that I, CHARLES H. STRATTON, of Salem, in the county of Columbiana and State of Ohio, have invented certain new and useful Improvements in Vehicles; and I do hereby declare the following to be a full, clear, and exact description of the invention, such as will enable others skilled in the art to which it appertains to make and use the same.

My invention relates to an improvement in vehicles, and more particularly to improve the construction of jump-seats and adjustable shifting dashes of carriages, buggies, and other similar conveyances.

One of the objects to be attained by my present invention is to so construct and connect the supporting-irons of front and rear seats of a vehicle that the rear seat may be advanced so as to locate it near the center of length of the body and the front seat be folded beneath the rear seat to afford room for the feet of occupants of this single seat, and also lock this rear seat in such forward adjustment automatically.

A further design of this invention is to afford a means whereby the relative position of the connected front and rear seats of the vehicle may be changed so as to permit the rear seat to be located in its normal position at the rear of the vehicle-body and the front seat forwardly lowered to a prostrate position at the front of the body near the dash, the lowered front seat and upright rear seat being automatically locked in the positions just mentioned by the act of moving them into place.

A further object is to so arrange and combine the jointed supporting-legs of the front and rear seats of a vehicle that the rear seat may be adjusted to its normal position at the rear end of the vehicle-body and the forward seat be elevated for use in spaced position with regard to the rear seat, the front seat being automatically locked by rear seat movement in assuming its relative position.

A further object is to provide the body of a vehicle that is designed for the use of jump-seats with tie-irons that are so combined with the pivoted limbs of a rear seat that these seat-supports and the rear seat itself are made to tie together the sides of the vehicle-body, to prevent its lateral disruption by the spreading action of the weight of the occupants of the rear seat.

A further object of this invention is to provide a vehicle-body in which two jump-seats are used with an adjustable dash-board, which will be automatically shifted by the act of adjusting these seats to occupy desired relative positions, the dash being forwardly moved when the front and rear seats are located in spaced position for use, both the seats and the dash-board being locked together to prevent accidental displacement from this relative adjustment of parts, and, if desired, permitting the forward movement of the front seat to re-cline it near the dash without altering the forward adjustment of the latter; and in case the forward seat is in reclining position, either forward, as just alluded to, or rearward, to lie under the rear seat, which latter is advanced toward the center of length of the vehicle-body, to be used as a single seat, the dash will be inwardly drawn by the act of moving the rear seat forward, so as to contract the space between the dash and single seat, thus affording a neat appearance to the vehicle when this adjustment of parts is effected.

A further object is to provide hinged or jointed arm-rests for the front seat of a pair of connected jump-seats, to permit these arms to fold down on the cushion of this seat when it is lowered or shifted to lie under the rear seat or other lowered positions.

A further object is to furnish a connected set of jump-seat irons for a two-seated vehicle, which will be of simple construction, ready production, affording light, strong, neat, and durable seat-supports, that possesses superior features of adjustability and convenience in use, and that may be manufactured at a low initial cost.

With these objects in view my invention consists in certain features of construction and combinations of parts, which will be hereinafter described, and pointed out in the claims.

Figure 2:
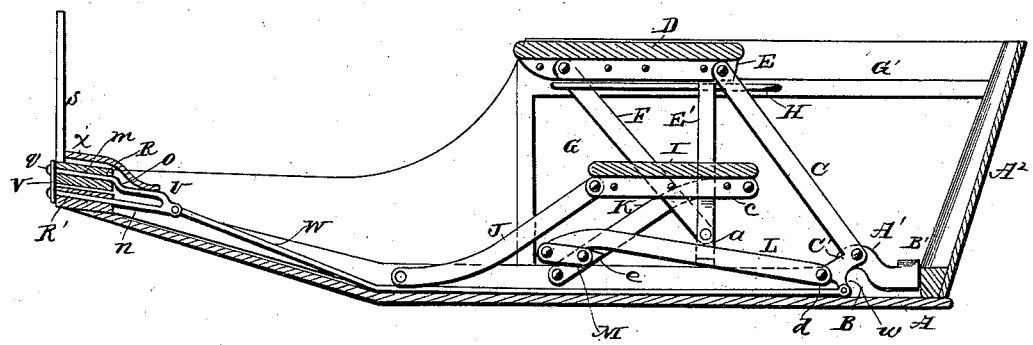
Figure 3:
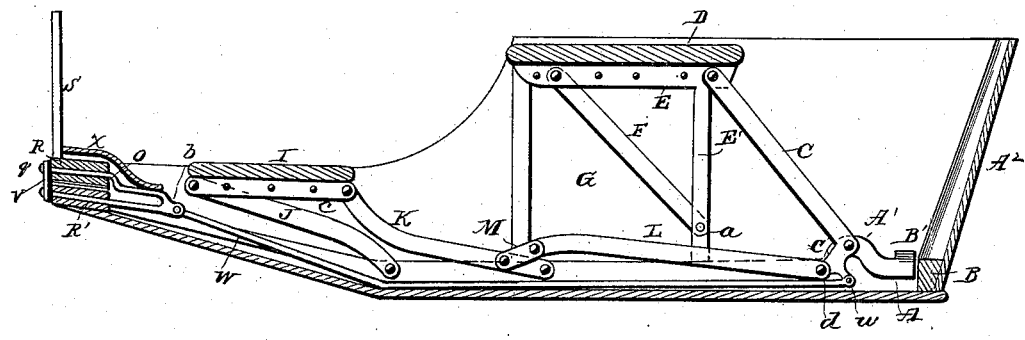
Figure 4:
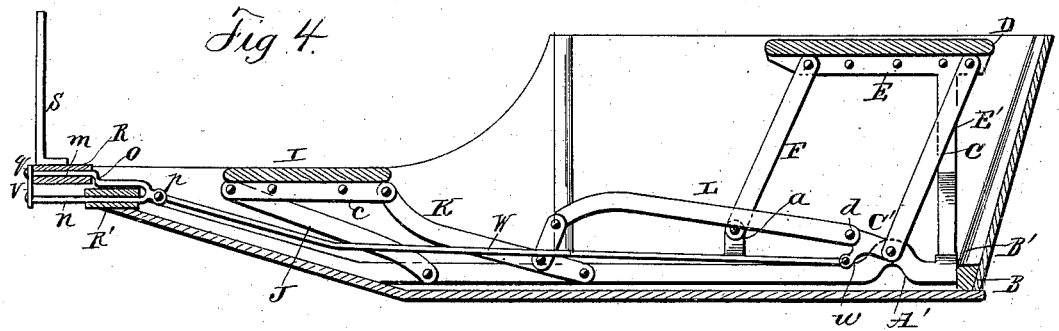
Figure 5:
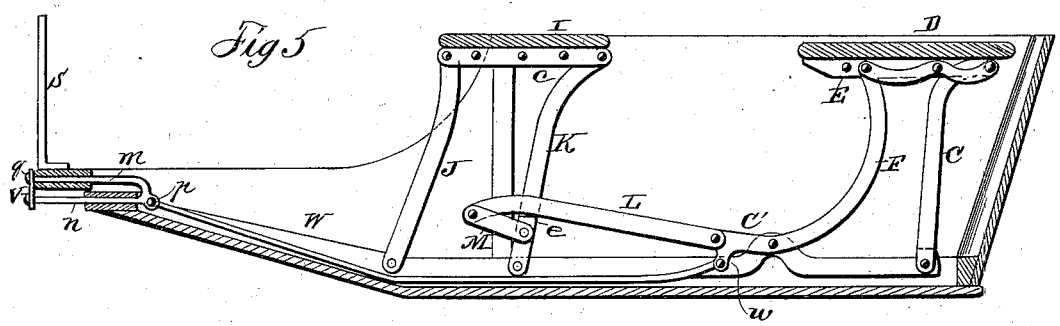
Figure 6:
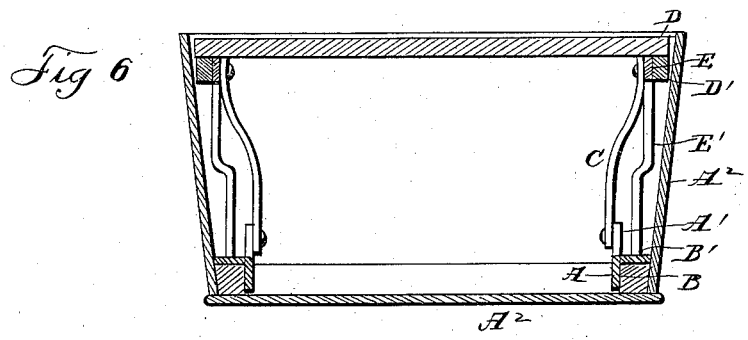
Figure 7:
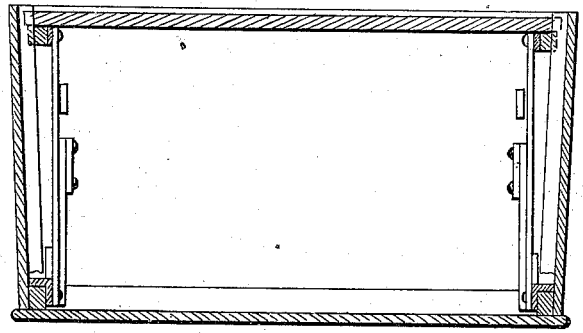
Figure 8:
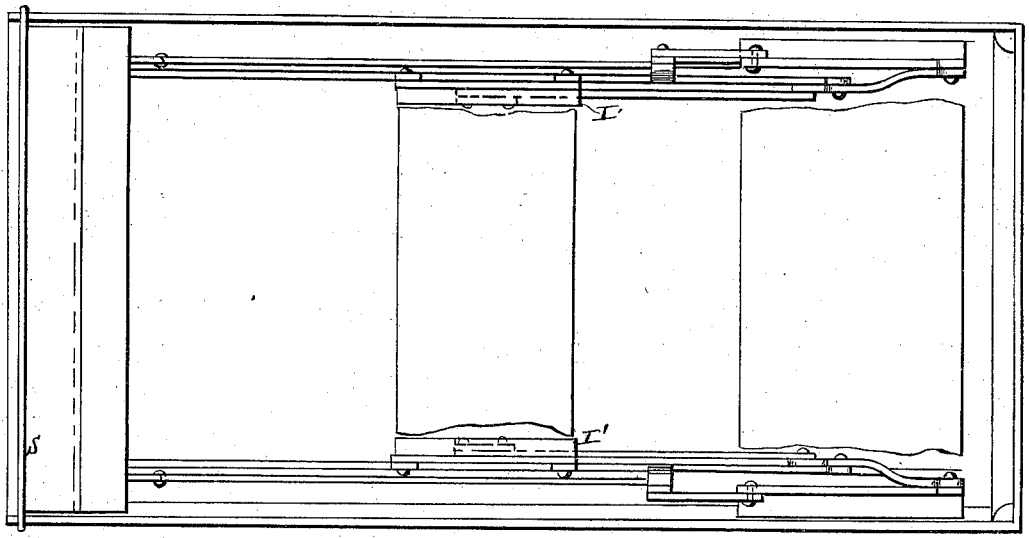

Referring to the drawings accompanying this specification, Figure 1 is a side elevation, in section, of the body of a vehicle and two sets of connected seat-irons with seats mounted on them, being elevated for use, and the dash shown projected forwardly. Fig. 2 is a side elevation, in section, of a vehicle-body with two sets of jump-seat irons and attached seats in place, the rear seat being advanced for use as a single seat, the front seat being lowered and projected beneath the rear seat, and the dashboard inwardly drawn to contract space between it and the single seat. Fig. 3 represents the vehicle-body in section, with two jump-seats in the same, the rear seat being advanced and locked in place near the center of length of the vehicle-body, and the forward seat lowered toward the dash, thus automatically locking the parts, the dash being rearwardly moved to reduce the space between it and the advanced rear seat. Fig. 4 is a side elevation, in section, of the vehicle-body, and shows the forward seat in a forwardly-depressed position near the dash and the rear seat adjusted near the rear end of the vehicle-body. Fig. 5 is a side elevation, in section, of a vehicle-body with a modified form of jump-seat irons, and a sliding dash-board, shown connected to the legs of the rear jump-seat, so as to automatically move when this seat is changed in position. Fig. 6 is a rear elevation of the vehicle-body shown in Fig. 1, with the seats upright and the rear end of the body removed to show the relative position of the seat-irons. Fig. 7 is a rear elevation of the body of a vehicle, with the rear end removed, the jump-seat irons shown in Fig. 5 being represented in this view. Fig. 8 is a plan view of the vehicle-body and seat-irons shown in Fig. 1, the ends of the seat-boards being broken away to expose the irons. Fig. 9 is a front end elevation of the vehicle-body with the dash in retracted position, as shown in side elevation in Fig. 2. Fig. 10 is a cross-section of the front sill of the vehicle-body, also the mechanism by which the dash-board is shifted outward or retracted toward the seat, the latter being in elevation. Fig. 11 shows a side elevation of the front of a vehicle, having a rectangular box-body or piano-body with the movable foot-board applied thereto. Fig. 12 represents a longitudinal elevation, in section, of a vehicle-body with two connected jump-seats, both in elevated position for use, the front seat having folding side-arm rests that are jointed to fold on the cushion, a sliding dash being also shown which is connected to the legs of the rear seat. Fig. 13 is a front elevation of the front seat, showing the folding side arms in elevated and folded position, the latter in dotted lines.

The rocker-plates A of the seat-irons constitute the base-pieces upon which these irons are pivoted to be adjusted and given required positions with regard to each other. These plates A are made from flat metallic bars, preferably of iron or soft steel, and are secured by screws or other means to the inner edge of the sills or bed-frame B of the vehicle-body A², thus stiffening the side sills of this frame, as the sustained load strain comes edgewise upon the rocker-plates. The rear ends of the rocker-plates A may be turned outwardly to bear upon the top surface of the bed-frame B at the points B'.

At A' the rocker-plates A are bent upwardly in an inverted-U shape to afford integral vertical brackets, upon which the rear limbs, C, of the rear seat are pivotally supported. The limbs C of the rear seat, D, are bent at the points where they are pivoted on the brackets A' to produce short links C', that extend forwardly and lie slightly inclined upwardly from a horizontal plane when the seat D is in rearward adjustment for use. The upper ends of the rear limbs, C, are pivoted to the seat-plates E, which latter are intended to be fastened by screws or other means to the inner faces of the end pieces, D', of rear-seat frame, D². These pieces D' may be paneled or otherwise finished upon their exterior surface to give the exposed ends of the seat an ornamental appearance.

Integral with the lower edge of the rear-seat plate, E, the depending standards E' are projected downwardly about at right angles to these plates to form legs or supports for the seat D, (see Fig. 6,) and it will be seen in this transverse view of the vehicle-body and rear seat that the rear limbs, C, are bent laterally in easy curves to throw their upper edges outward a proper distance to engage the seat-plates E at their rear ends, the depending standards E' resting with their lower free ends upon the bent ends B' of the rocker plates A.

At the forward ends of the rear-seat plates, E, the front limbs, F, of the rear seat, D, are pivoted upon the side surfaces of these plates, and the lower ends of these front limbs, F, are pivoted to the upwardly-turned integral projections a of the rocker-plates A, said projections a being first bent outward to lie closely upon the top surface of the sills B, and be secured to the same by screws or other means. The outward and upward projection of the pieces a, just described, are so made to cause the outer faces of the vertical portions of the same to properly line with the front limbs, F, of the rear seat and permit a free action of the seat on its pivoted limbs.

It will be noticed that by the method of construction of the rear-seat limbs just described and their connection with the rocker-plate A the front limbs will work near to the adjacent sides G of the body of the vehicle, while the rear limbs are connected and bent so as to allow a space to intervene between a front and rear limb at each side of the seat. In Figs. 1 and 2 another form of rear-seat support is shown, which may be employed when the standards E' in said figures are not used.

Upon the sides G of the vehicle-body, near the top edges of the same, the seat-supporting strips or upper body-rails, G', are attached. These are designed to give a support to the seat D by contact of its ends with their top edges, and as the strips G' are extended parallel to each other and a proper distance from the bottom of the body it is evident that the limbs of the rear seat, D, may be vibrated upon their points of pivotal support, and this seat be caused to rock forward and rest in such a position of forward adjustment as will be necessary to suit its uses as a single seat when the front seat is folded or lowered, as will be hereinafter explained.

Preferably near the top edge of the seat-supporting strips G' the elongated tie-bars H are affixed by their ends $b$ to the sides of the vehicle-body. These tie-bars are made of metal of suitable thickness to give necessary strength. They are bent at right angles at each end of the bar in the same plane to produce short limbs, by which the bars are attached to the sides of the vehicle-body, as stated. The tie-bars H, from their position on the inner surface of the sides of the vehicle-body, are made to afford slots that extend between the bent ends $b$ of each tie-bar, the width of these slots being represented by the space intervening between the bars H and the opposite sides of the vehicle-body.

The front limbs, F, of the rear seat, D, are located to work freely between the tie-bars H and the sides of the body and have a bearing-contact with the adjacent bars, so that a seat board or frame, D, mounted upon and secured to the end blocks or pieces, D', of the rear-seat irons will, by its positive connection with the forward limbs, F, of the rear seat, coact with the same to tie the sides of the vehicle-body to resist a bursting strain that the weight of the occupant of the seat may occasion.

The tying together of the sides of the vehicle-body in the manner just stated is particularly necessary and valuable when the standards E' are dispensed with, which may be desired in some forms of vehicle construction, as in this case the entire weight of parties who occupy the rear seat will be imposed upon the strips G', and without the tying together of the sides, as provided for, these light sides might be outwardly forced and injured by heavy weight placed upon the seat D.

In case it is preferred to use the standards E' to support the rear seat, D, the strips or top body-rail, G', may be dispensed with, as shown in Figs. 3 and 6, so as to depend solely on the standards E' for a rear-seat support independent of the body of the vehicle. In this latter-named form of construction the ends of the seat D have no contact or connection whatever with the inner surface of the sides of the vehicle-body.

The forward seat, I, is secured upon the end blocks, I', (see Fig. 8,) which latter are made of any suitable material, preferably wood, and are given any preferred shape or finish on the outer surface to suit the style of the vehicle and harmonize with the style and form of the rear seat and blocks or pieces D'. The end blocks, I', are affixed by screws or otherwise to the seat-plates $c$, which latter are pivotally secured at each end to the front and rear legs, J K. The front legs, J, and rear legs, K, of the front seat, I, are also pivoted at their lower extremities to the inner surface of the rocker-plates A, the front legs being curved edgewise to project their curved edges rearwardly, while the upper ends of the rear legs, K, are curved in an opposite direction, or with the projecting portion toward the front edge of the seat.

The length of the front and rear legs of the front seat is such, relatively, that the seat-surface will be about horizontal and the legs be slightly inclined toward the rear seat, D, when the front seat is in a proper position for use, as shown in Fig. 1.

The front and rear seats are connected by the parallel bars L, which have their rear ends, $d$, pivoted to the short front projecting limbs, C', of the rear limbs, C, that are attached to the rear seat, D, and the forward ends of these parallel bars L are attached by pivots to the ends of the short links M, which latter have their other ends pivoted to the inner sides of the rear legs, K, of the front seat.

Each rear leg, K, of the front seat is re-enforced and thickened from the lower end to a point, $e$, upon the inner surface of each, where an offset or projecting shoulder is formed, and as the ends of the links M are pivoted upon these re-enforced portions of the legs K, just below the shoulders $e$, it is apparent that the lower edges of the bars L will rest upon the shoulders $e$ when the front seat is elevated for use, as shown in Fig. 1. The front ends of the parallel bars L being bent slightly downward to allow their pivoted ends that connect the links M to lie below the offset shoulders $e$, and the pivotal point of connection of the rear ends, $d$, with the upwardly-inclined limbs C', lying in a plane above the pivot-points of connection of the forward ends of the parallel bars L with the links M, a lock of the front seat is assured that is rendered immovable when the seat is occupied.

It will be evident upon an inspection of Fig. 2 that the rear seat, in advancing from its rearward position, (shown in Fig. 1,) will be carried upward and describe an arc, as its limbs lie in a diagonal position, inclined toward the rear, when in the adjustment shown in Fig. 1, and their length will be added to the height of the rocker-plate projections, upon which they are pivoted, when the limbs F G are at right angles with the top edges of the rocker-plates A. Consequently there will be ample clearance-room between the top of the front seat and the under side of the rear seat when the seats are being moved to assume the position shown in Fig. 2.

If seat-supporting standards E' are used in connection with the rear seat when this seat is advanced to be used as a single seat and the front seat folded, as shown in Fig. 2, the free lower ends of these standards E' will rest upon the bent-over portions $a$ of the front leg bracket-supports of the rear seat, to which the lower ends of these front legs, F, are pivoted, so that a stable base is thus afforded to the standards, which sustain the weight placed upon the seat in either a position of forward or rearward adjustment. When the front seat is lowered forward, as shown in Fig. 3, and the rear seat advanced, the bent ends of the parallel bars L and the attached links M will together form arched braces, which lock the front and rear seats in place, as adjusted, and when the seats are located as shown in Fig. 4 they will be similarly locked.

As is indicated in the statement of objects of this invention, it also comprises a means for adjusting automatically a transverse front rail of the vehicle-body on which the dash-board is secured, so that the latter will be projected forwardly or retracted a proper distance when the vehicle is used either as a double or single seat conveyance.

The adjustable dash S is shown in Fig. 1 as forwardly extended. The operating mechanism of the extension-body and movable dash consists of a rail or front board, R, which is mounted on the front cross-sill, R', of the body-frame of the vehicle.

The relative length of the foot-board R is such that it will slide freely within the sides of the vehicle-body, which latter may be cut away in easy curves forward of the upright position of the front seat, so as to have the top edges of said sides in line with the top surface of the foot-board R, as is usual in some forms of bodies, to afford room for the free entrance of seat occupants.

The breadth from the front to the rear edge of the foot-board R is about equal to that of the transverse sill-piece R', so that when the dash is retracted to shorten its distance from the rear seat, when the latter is located as shown in Fig. 2, the foot-board will be located directly above the cross-sill R'. The dash S is mounted on the foot-board and secured thereto in the usual way.

It is essential for the proper operation of the movable dash S that it and its sustaining foot-board R should be slidingly but securely held in place on the cross-sill R', so that it will not be liable to displacement, either vertically or laterally. To effect this result in a simple and reliable manner, I provide two guiding parallel bars, U, one of the bars being shown in position in Fig. 10. These bars U are both of similar form and size, located near each side of the vehicle-body; hence a description of one will answer for both.

The guide-bar U (shown in Fig. 10) is made of metal, preferably round in cross-section, the length of said bar being sufficient to permit it to be doubled, so as to afford two limbs, m n, the lower limb, n, being inserted through a hole made transversely in the cross-sill R', of a size to allow the limb to slide neatly in it. The upper piece or limb, m, of the bar U has an offset bend made in it at o to close the two portions m and n sufficiently together from this point inwardly toward the integral loop p to allow the upper limb, m, to slide above the upper surface of the cross-sill R'. From the point o toward the outer end, q, of the upper limb, m, this limb is parallel to the lower limb, n, and at such a distance above that it may be inserted through a perforation made in the foot-board R, immediately above the lower limb, n, of the guide-bar.

The length of the upper limb, m, is such, in regard to the breadth of the foot-board R, that when it is forced through the hole made for it in the foot-board until the shoulder o is in contact with the inner edge of the foot-board projecting ends are afforded to both the limbs m n, and on these ends a vertical connecting-bar, V, is secured to hold the limbs spread apart and parallel to each other, the upper limb being secured rigidly to the cross-bar R and the lower limb, n, free to slide in its box or hole provided in the bed-sill R'.

At the inner termination of the guide-bar U an integral eye, p, is formed therein by the bending of the same, as has been explained, and a connecting-bar, W, is pivoted to this looped end of the guide-bar by one of its ends, the other end of the bar W extending rearwardly a sufficient distance when the seats are in the position shown in Fig. 1 to be pivotally attached to a depending integral leg, w, which is formed on the rear limb, C, of the rear seat, D, and when the seats are both in the position therein shown the foot-board and dash will be extended forwardly to afford space for the proper occupancy of the front seat.

It will be observed that the dash-board will be locked in either forward or rearward adjustment and the body of the vehicle correspondingly extended or shortened by the adjustment of the rear seat in a rearward or forward position, and as the bars W are located near the side sills of the body there will be no obstruction of foot-space effected by the operative mechanism of the foot-board and dash.

In Figs. 5 and 7 the foot-board extension and movable dash-board are shown in connection with another form of the jump-seat mechanism, which I have secured by patent already, and it will be seen that in this application of the movable foot-board and dash-board the operating-bars are also attached to depending legs formed on the front limbs of the rear seat, so that the body will be lengthened or shortened and the dash moved outward or rearward by the act of changing of position of the seats of the vehicle and be locked in any desired position automatically.

In case a movable foot-board is to be adjusted to afford foot-room where there are jump-seats used in a vehicle-body that is of the piano or rectangular form, as represented in Fig. 11, the dash is divided into two sections, the upper portion, r, being fixed to the front of the body O by any suitable means and at any desired height to afford free foot-space below it.

Upon the foot-board v, which is made similar to those shown in the other figures, a supplementary dash, r', is provided—that is, affixed to the upper surface of the foot-board v—and this foot-board is adapted to be shifted a proper distance forward to open a gap by the removal of the lower dash, r', or panel, which is forwardly moved when both seats are in the upright position, (shown in Fig. 11,) or ready for use, the folding of the front seat sliding the movable portion of the dash rearward a sufficient distance to close up the opening and align it with the upper fixed part, r, of the same.

The gap on each side and top of the dash r', that is produced by its forward projection, may be closed up by any suitable means that may be desired, to afford a proper finish, as by winged panels affixed at the ends of the dash. The lower portion of the dash may be paneled to conform in style to the vehicle-body and these wings, and thus present a neat uniform appearance when the lower dash-board is outwardly extended.

The top surface of the foot-board may be covered by an apron of carpet or oiled cloth, X, to provide a suitable finish to the same, the cover being tacked or otherwise secured to the top surface of the foot-board to move with it. Other means may be employed to finish up the inside surface of the vehicle-body at its forward portion than those mentioned; hence I do not restrict myself to the covering mentioned.

It is evident that, if preferred, the connecting-bar W may be pivoted to the side of the limbs C of the rear seat above their pivoted points of connection with the curved projections of the rocker-plates, and by a change of position nearer to or farther from these pivots the throw of the rod W, and consequent movement of the foot-board R, may be altered.

It is not imperative that the connecting-bars W be pivoted to the front limbs of the rear seat, D, as by extending them rearwardly to a proper length they may be pivoted to the rear legs, C, of the rear seat below their pivots on the rocker-plates. It is also evident that the sliding dash and its operating mechanism may be used in connection with other jump-seat irons than have herein been shown and described; hence I do not wish to limit its use in this respect, reserving the right to combine the movable dash-board and its operating devices with any other style of jump-seat irons available to act in connection therewith.

Another important feature of this invention is shown in Figs. 12 and 13 of the drawings. It consists in the hinged attachment of the side arms, 12, to the front seat of two jump-seats. In the attachment of these side arms the seat proper is first provided on its front and rear edges with plates 13, preferably bent outwardly at each end to produce lugs or projections 14, which are slightly beveled for a purpose presently explained. It is obvious that the plates 13 may not extend the entire width of the seat, but instead be made shorter, and one of these short plates placed at each corner of the seat.

Pivoted or hinged to the plates 13, a short distance from the side edges of the seat, are brackets or supports 15, having their upper portions, 16, bent inwardly at obtuse angles to the lower portions, as shown in Fig. 13 in dotted lines. The portions 16 are also preferably bent forward slightly and have framed armrests 12 secured between them at each side of the seat for the reception and support of cushions of any desired construction. When the armrests 12 are in their raised position, the lower portions of the brackets 15 will seat upon the beveled upper ends of the lugs 14 and be supported by said lugs, the cushions of the arm-supports and the cushion on the seat meeting and producing a neat joint. By this construction when the arm-rests are lowered or folded down upon the seat they will move in the arc of a circle, and hence swing clear of the seat-cushion at the side edges of the same.

The folding arms 12 may be given any preferred form or style to harmonize with that of the rear seat, and thus provide a neat and artistic finish to vehicles fitted with such apparatus.

Any preferred form of jump-seat irons may be used in combination with the folding front-seat arms just described. Said arms are available and particularly desirable when the forward seat of a pair of jump-seats is devised to fold or lie below the rear seat when the latter is advanced to be used as a single seat.

Many slight changes might be made in the details of construction of this invention and not exceed the scope of the same. I do not, therefore, restrict myself to the exact forms shown herein; but, Having fully described my invention, what I claim as new, and desire to secure by Letters Patent, is—

1. The combination, with a vehicle-body and seats pivotally supported therein, of tie-bars secured to the sides of the body and embracing legs of the seat for limiting the movement of said legs.

2. The combination, with a vehicle-body, seats, and supporting-legs pivoted in the body and to the seats, of tie-bars secured to the inner sides of the body and adapted to loosely receive legs of one seat, and thereby regulate their position, substantially as set forth.

3. The combination, with the rear seat, its supporting-limbs, and two rocker-plates, of a pair of tie-bars attached to the sides of the vehicle-body to prevent their outward strain, by tying them together with the seat and its limbs, substantially as set forth.

4. The combination, with a rear seat, its limbs and supporting-standards, of a front seat, legs supporting the same, the rear legs having shoulders formed thereon, and two parallel bars loosely connecting the legs of the two seats and adapted to bear against the shoulder on the legs of the front seat when the seats are elevated, substantially as set forth.

5. The combination, with the body, rear seat, and a pair of connected jump-seats, of supporting-standards secured to the side plates of the rear seat, and tie-bars secured to the inner sides of the body to assist in supporting the seat, substantially as set forth.

6. The combination, with the sides of a vehicle-body and seat-supporting strips affixed to the inner surface of these sides, of a seat adapted to move front and rearward on pivoted limbs, and tie-bars to tie the sides of the body together by sliding connection with them of the front limbs of the rear seat, substantially as set forth.

7. The combination, with the sides of a vehicle-body, tie-bars, and strips that support a rear seat and are affixed to the inner surfaces of these sides, of a rear seat, its pivoted limbs, two seat end plates, and two rocker-plates, substantially as set forth.

8. The combination, with a dash, a foot-board, and a cross sill on which the foot-board rests, of bifurcated guide-bars, the upper limbs being attached to the foot-board rigidly, and the lower limbs adapted to slide in holes in the cross-sill, and means to move the guide-rods endwise, substantially as set forth.

9. The combination, with a foot-board, a dash fixed to it, and a cross-sill of the vehicle-frame, of parallel guide-bars fastened to the foot-board and adapted to slide in holes in the cross-sill, and connecting-bars pivoted to the inner ends of the guide-bars and also to the limbs of the rear jump-seat, substantially as set forth.

10. The combination, with the body of a vehicle, a cross-sill fixed thereto, and parallel guiding-bars adapted to slide backward or forward in the sill, of a foot-board held fast to the guiding-bars, and a dash secured to said foot-board, substantially as set forth.

11. The combination, with the body of a vehicle, sliding seats therein, and connecting-bars having pivotal connection with legs of the seats, of a fixed cross-sill in the forward end of the body, parallel guiding-bars adapted to slide therein, the latter being pivoted to the connecting-bars, a foot-board held fast to the guiding-bars, and a dash secured to the foot-board, substantially as set forth.

12. The combination, with a pair of pivoted jump-seats, the rear legs of one seat having a downwardly-projecting web thereon, of a sliding dash, and a connecting-rod pivoted to the dash and to the web, whereby the former is operated by a movement of the seat, substantially as set forth.

In testimony whereof I have signed this specification in the presence of two subscribing witnesses.

CHARLES H. STRATTON.

Witnesses:
G. S. BOONE,
C. F. STREET.